United States Patent
Fukushima et al.

[11] Patent Number: 6,084,903
[45] Date of Patent: Jul. 4, 2000

[54] METHOD FOR MELTING INCINERATION RESIDUE AND APPARATUS THEREFOR

[75] Inventors: Tsutomu Fukushima; Yoshinari Fujisawa, both of Yokohama; Keisuke Nakahara, Chigasaki; Tsuyoshi Nakao; Masahiro Sudou, both of Yokohama, all of Japan

[73] Assignee: NKK Corporation, Tokyo, Japan

[21] Appl. No.: 08/987,708

[22] Filed: Dec. 9, 1997

[51] Int. Cl.⁷ ..................................... H05B 3/60
[52] U.S. Cl. .............................. 373/121; 373/8
[58] Field of Search ................. 373/121, 9, 8; 75/10, 14, 665, 10.66, 581; 423/210.5; 110/342, 346

[56] References Cited

U.S. PATENT DOCUMENTS

| | | |
|---|---|---|
| 2,244,267 | 6/1941 | Slayter et al. . |
| 3,647,358 | 3/1972 | Greenberg ............................ 423/210.5 |
| 4,499,833 | 2/1985 | Grantham ................................. 110/342 |
| 4,697,274 | 9/1987 | Enkner et al. . |
| 5,066,326 | 11/1991 | Agarwal et al. ........................... 75/581 |
| 5,218,617 | 6/1993 | Herrera-Garcia et al. ............. 75/10.66 |
| 5,222,448 | 6/1993 | Morgenthaler et al. ................. 110/346 |
| 5,258,055 | 11/1993 | Pargeter et al. ........................... 75/665 |
| 5,402,439 | 3/1995 | Bullmann et al. ........................... 373/9 |
| 5,490,869 | 2/1996 | D'Obrenan et al. .................... 75/10.14 |
| 5,535,234 | 7/1996 | Bullmann ................................... 373/8 |
| 5,748,666 | 5/1998 | Andersson et al. .......................... 373/9 |

FOREIGN PATENT DOCUMENTS

| | | |
|---|---|---|
| 0176497 A1 | 4/1986 | European Pat. Off. . |
| 0551056 A1 | 7/1993 | European Pat. Off. . |
| 0670188 A1 | 9/1995 | European Pat. Off. . |
| 2589228 | 10/1985 | France . |
| 40 33 304 A1 | 4/1992 | Germany . |
| 7-042924 | 2/1995 | Japan . |
| WO 95/17981 | 7/1995 | WIPO . |

*Primary Examiner*—Teresa Walberg
*Assistant Examiner*—Quang Van
*Attorney, Agent, or Firm*—Frishauf, Holtz, Goodman, Langer & Chick, P.C.

[57] ABSTRACT

A method of melting an incineration residue includes steps of: charging an incineration residue containing salts into a melting furnace; heating the charged incineration residue in the melting furnace to produce a melt which includes a molten slag layer and a molten salt layer on the molten slag layer; controlling a temperature of the molten salt in the molten salt layer; discharging the molten slag from the melting furnace; and discharging the molten salt from the melting furnace. An apparatus for melting an incineration residue includes: a melting furnace main body, having a molten slag hold-up section and a molten salt hold-up section on the molten slag hold-up section, into which an incineration residue containing salts is charged; a charging device for charging the incineration residue in the melting furnace main body; a heating device for melting the charged incineration residue to produce a melt comprising a molten slag in the molten slag hold-up section and a molten salt being in the molten salt hold-up section; a control device for controlling a temperature of the molten salt in the molten salt hold-up section; a slag discharge port for discharging the molten slag from the molten slag hold-up section; and a salt discharge port for discharging the molten salt from the molten salt hold-up section.

28 Claims, 8 Drawing Sheets

METHOD FOR MELTING INCINERATION RESIDUE AND APPARATUS THEREFOR

BACKGROUND OF THE INVENTION

1. Field of the Invention

The present invention relates to a method for melting incineration residues containing salts, such as an incineration residue from municipal refuse, and an apparatus therefor.

2. Description of the Related Arts

A major portion of incineration residue which forms during incineration from municipal refuse and industrial waste has been disposed in landfills, and volume reduction of the residue has been required as reclaimed grounds can be secured only with great difficulties. Since ash (fly ash) in the incineration residue, which is scattered with exhaust gas after combustion and collected by a dust collector, contains heavy metals, such as lead and cadmium, and is designated as general waste under special control, it must be subjected to innocuous disposal before dumping. Therefore, both volume reduction of the incineration residue in the incinerator and innocuous disposal of scattered ash are required.

Disposal methods for melting and solidifying the incineration residue have been developed as a technology for simultaneously achieving volume reduction of the incineration residue and innocuous disposal of heavy metals by insolubilization in order to overcome the above-mentioned problems. One method for melting and solidifying includes continuous-feeding and melting of the incineration residue while holding the melt of the incineration residue. This method is capable of separating the melt components held in the furnace into a molten slag layer and a molten salt layer by the differences in specific gravity, and thus the melt can be fractionally exhausted as molten slag and molten salt.

In the above-mentioned method, the molten salt is always present in the furnace, and large amounts of low-boiling-point materials, i.e. alkaline chlorides, such as NaCl and KCl, which are contained in the molten salt, are volatilized. The volatilized alkaline metal salts condense in the components of the exhausting system, result in clogging the exhausting system, corroding the components, and inhibit stable operation of the melting furnace.

A melting-disposal method for solving such problems is disclosed in Japanese Unexamined Patent Publication No. 7-42,924 in which a melting furnace suppressing volatilization of low-boiling-point material is used. This method relates to an electrical-resistance heating-type melting furnace, in which electrodes immersed into the melt of the incineration residue are energized to heat the melt by the electric resistance heat and melt the incineration residue which is continuously fed.

FIG. 15 is a longitudinal cross-sectional view of such an electrical-resistance heating-type melting furnace. Reference numeral 30 represents a furnace main body, reference numeral 31 represents electrodes, reference numeral 50 represents a fed incineration residue, reference numeral 52 represents a molten slag layer formed by melting the incineration residue, and reference numeral 51 represents a molten salt layer formed by the melting of salts in the incineration residue. Also, reference numeral 33 represents an outlet of the exhaust gas and reference numeral 34 is an outlet of the melt. In this melting furnace, the molten salt layer 51 inside a partition wall 35 provided between the roof and the melting zone in the furnace main body is covered the fed incineration residue 50, and the molten salt layer 51 outside the partition wall 35 is covered with a powdery material having a lower specific gravity than that of the molten salt, such as carbon, to suppress volatilization of the low-boiling-point materials from the molten salt layer.

The incineration residue containing salts is a mixture of oxide components having melting points ranging from 1,400° C. to 1,600° C. and salt components having melting points ranging from 700 to 800° C., whereas the incineration residue is heated to a high temperature region higher than the melting points of the oxide components during the furnace operation, at which all the components are melted. Therefore, salts having low melting points are heated to an excessively high temperature. Because the melting points of these salts range from 1,400° C. to 1,600° C. and their vapor pressures markedly increase at near 1,100° C., the low-boiling-point materials are extremely volatile in the furnace.

In this regard, the prior art method cannot suppress the vapor pressure of the molten salt as a source of the low-boiling-point materials regardless of the use of a remedy in which the molten salt and the incineration residue are covered with a powdery material such as carbon, because such a remedy has merely an intention of collecting the molten salt with the incineration residue and carbon. Therefore, such a method is not effective against suppression of volatilization of the low-boiling-point materials.

SUMMARY OF THE INVENTION

It is an object of the present invention to provide a method for melting incineration residues containing salts and an apparatus therefor which permits a drastic reduction of the volatilization of low-boiling-point materials.

To attain the object, the present invention provides a method for melting an incineration residue comprising the steps of:

- charging an incineration residue containing salts into a melting furnace;
- heating the charged incineration residue in the melting furnace to produce a melt comprising a molten slag and a molten salt, said molten slag forming a molten slag layer and said molten salt forming a molten salt layer on the molten slag layer;
- controlling a temperature of the molten salt in the molten salt layer;
- discharging the molten slag from the melting furnace; and
- discharging the molten salt from the melting furnace.

The heating of the charged incineration residue is preferably carried out by the following methods:

(a) heating the molten slag by applying a voltage between a plurality of electrodes which are submerged in the molten slag so as to generate a heat due to an electric resistance of the molten slag, (b) heating the molten slag by applying a high frequency electric current to an induction-heating coil which is arranged on the periphery of the melting furnace, or (c) heating the molten slag by applying a voltage between a movable electrode which is immersed in the molten slag and a bottom electrode which is arranged at the bottom of the melting furnace.

In the step of controlling the temperature of the molten salt, it is preferable to control the temperature within a range of 700 to 1000° C. When the temperature of the molten salt is over 1000° C., the molten salt volatilizes. When the temperature of the molten salt is below 700° C., the melt may be solidified.

Since the molten salt is heated by the heat transferred from the molten slag, it is desirable to lower the temperature of the molten salt. Whereas, since the surface of the molten salt layer is easily cooled, it is preferable to heat the surface of the molten salt layer.

The following methods are preferable to lower the temperature of the molten salts;

(A) decreasing a heat transfer from the molten slag to the molten salt, (B) increasing heat radiation from the molten salt, or (C) forcedly cooling the molten salt.

There are two manners in the method (A) for decreasing the heat transfer. In the first manner, the incineration residue is charged into the molten salt layer to form a mixed layer of the incineration residue and the molten salt in the bottom section of the molten salt layer. In the second manner, a cross-sectional area of a molten salt hold-up section is reduced to be smaller than that of a molten slag hold-up section.

Further, the present invention provides an apparatus for melting an incineration residue comprising:

a melting furnace main body into which an incineration residue containing salts is charged;

a charging device for charging the incineration residue in the melting furnace main body;

a heating device for melting- the charged incineration residue to produce a melt comprising a molten slag and a molten salt;

a control device for controlling a temperature of the molten salt in a molten salt hold-up section;

a slag discharge port for discharging the molten slag from a molten slag hold-up section; and a salt discharge port for discharging the molten salt from the molten salt hold-up section.

The melting furnace main body comprises the molten slag hold-up section and the molten salt hold-up section on the molten slag hold-up section. The molten slag exists in the molten slag hold-up section and the molten salt exists in the molten salt hold-up section.

The heating device for melting the charged incineration residue has the following three manners:

(a) A heating device comprising a plurality electrodes which are submerged in the molten slag, a voltage being applied between the plurality of electrodes, (b) A heating device comprising an induction-heating coil which is arranged on the periphery of the molten slag hold-up section, the molten slag being heated by applying a high frequency electric current to the induction-heating coil, and (c) A heating device comprising a movable electrode which is submerged in the molten slag and a bottom electrode which is arranged at the bottom of the melting furnace main body, the molten slag being heated by applying a voltage between the movable electrode and the bottom electrode.

The control device preferably controls the temperature of the molten salt within a range of 700 to 1000° C. Since the molten salt is heated by the heat transferred from the molten slag, it is desirable to lower the temperature of the molten salt. Since the surface of the molten salt layer is easily cooled, it is preferable to heat the surface of the molten salt layer.

The following devices are preferable to lower the temperature of the molten salt.

(A) a device for decreasing a heat transfer from the molten slag to the molten salt, (B) a device for increasing heat radiation from the molten salt, or (C) a device for forcedly cooling the molten salt.

There are two manners in said means (A) for decreasing the heat transfer. In the first manner, the incineration residue is charged into the molten salt layer to form a mixed layer of the incineration residue and the molten salt in the bottom section of the molten salt layer. In the second manner, a cross-sectional area of a molten salt hold-up section is reduced to be smaller than that of a molten slag hold-up section.

The charging device comprises an incineration residue feeding pipe arranged at the upper part of the melting furnace main body. The lower end of the incineration residue feeding pipe is positioned below the surface of the molten salt.

In the present invention, the incineration residue containing salts refers to both dust-collection ash (fly ash) formed during incineration from municipal refuse and a mixture of several types of dust-collection ashes.

DESCRIPTION OF THE EMBODIMENT

Figure 1:
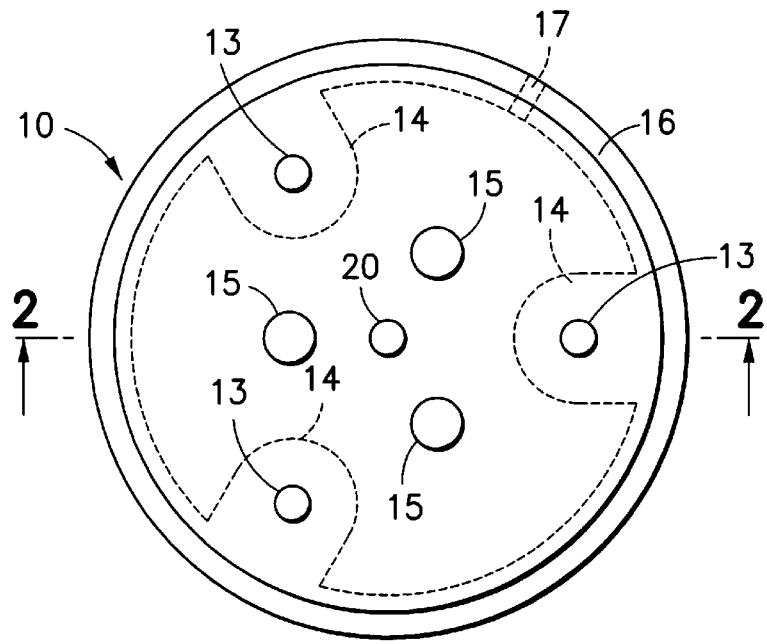
FIG. 1 is a plan view illustrating an embodiment in accordance with an apparatus for melting an incineration residue of the present invention.

An essential feature in the present invention is to reduce the vapor pressure of the low-boiling-point materials by decreasing the temperature of the molten salt layer and to suppress volatilization of the low-boiling-point materials thereby.

In the melting-disposal method in accordance with the present invention, the temperature of the molten salt layer is controlled to be within a specified range. Because the low-boiling-point materials contained in the incineration residue essentially consist of alkaline metal chlorides, such as NaCl and KCl, and vigorously volatilizes at a temperature above near 1,100° C. as described above, the temperature of the molten salt layer must be controlled to be 1,000° C. or less to suppress volatilization. However, the melt may be solidified at a temperature of the molten salt layer of 700° C. or less. Therefore, it is preferable that the temperature of the molten salt layer be within a range of 700° C. to 1,000° C.

The molten salt layer formed the melting the incineration residue is heated by means of heat transfer from the molten slag layer thereunder. Methods of control for preventing a rise in the temperature of the molten salt layer include decreasing heat transfer from the molten slag layer, increasing heat dissipation from the molten salt layer, or forced cooling of the molten salt layer. Therefore, the melting furnace for disposing the incineration residue containing salts preferably has a structure which can control the molten salt layer within an adequate temperature range.

One means for decreasing the temperature of the molten salt layer in the present invention is a molten salt layer cooling means for forcibly cooling the molten salt layer which is provided on the periphery of the salt holdup section.

There are some methods for decreasing heat transfer from the molten slag layer to the molten salt layer, and one of these is feeding of the incineration residue into the molten salt layer. Therefore, in the melting furnace in accordance with the present invention, the bottom end of the incineration residue feeding pipe is located below the upper surface of the molten salt layer so that the lower portion of the incineration residue feeding pipe is immersed into the molten salt layer. When the incineration residue is fed in such a state it gradually settles and is dispersed into the molten salt layer to form a layer, in which both the incineration residue and the molten salt is present, in the bottom section of the molten salt layer (hereinafter referred to as a mixed layer). Since the mixed layer is a suspension or slurry of incineration residue particles and contains a solid component having a low thermal conductivity, the thermal conductivity of the mixed layer is lower than that of the single molten salt material. Thus, the mixed layer inhibits heat transfer and can suppress an excessive temperature rise of the molten salt layer.

Another method for decreasing the heat transfer from the molten slag is area reduction of the interface between the molten salt layer and the molten slag layer. In this regard, the upper section of the furnace in accordance with the present invention is narrowed to hold the molten salt, whereas the molten slag is held in the lower section of the furnace which is not narrowed. Thus, the area of the interface between both layers is reduced, heat transfer from the molten slag layer to the molten salt layer is reduced, and an excessive temperature rise of the molten salt layer can be suppressed.

Since the furnace wall has a large area relative to the volume of the molten salt held in the upper narrow section, heat dissipation from the molten salt layer is promoted to suppress an excessive temperature rise of the molten salt layer.

Since the periphery of the furnace has a large area relative to the volume of the molten salt held in the upper narrow section and a small amount of molten salt forms a thick molten salt layer, the molten salt layer can be readily cooled by a forced cooling means provided on the periphery of the furnace.

Figure 2:
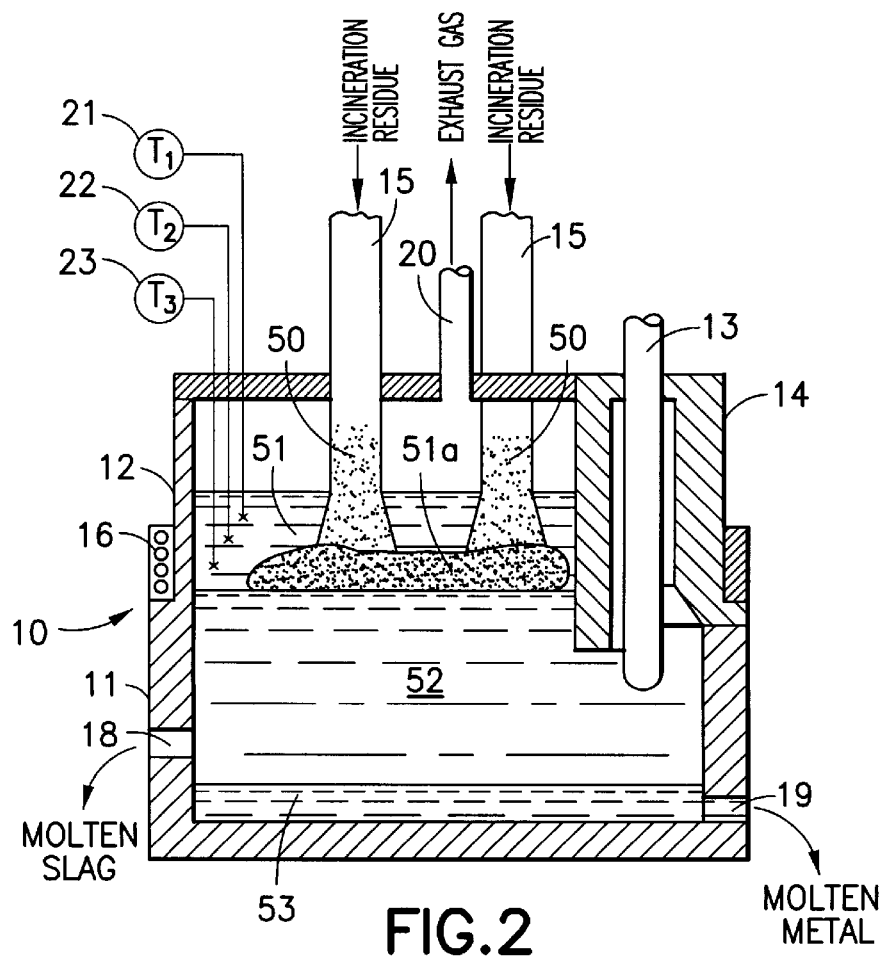
FIG. 2 is a cross-sectional view taken from the line 2—2 in FIG. 1.

FIG. 1 is a plan view illustrating an embodiment in accordance with a melting furnace of the present invention, and FIG. 2 is a cross-sectional view taken from the line 2—2 FIG. 1. The melting furnace is of an electric resistance heating type and includes a melting furnace main body 10, a plurality of electrodes 13, a plurality of incineration residue feeding pipes 15. In the drawings, reference numeral 50 represents an incineration residue containing salts, reference numeral 51 represents a molten salt layer, and reference numeral 52 represents a molten slag layer.

The melting furnace main body 10 is divided into a section for holding the molten slag and a section for holding the molten salt, the lower section of the melting furnace main body 10 is a molten slag holdup section 11, and the upper section is a molten salt holdup section 12. Also the melting furnace main body 10 is provided with a plurality of electrode immersion sections 14 having feeding ports of electrodes therein.

The slag holdup section 11 holds the molten slag, heats the molten slag layer 52 through electrodes 13 immersed therein, and melts the incineration residue fed from the incineration residue feeding pipes 15 by heat of the molten slag layer 52 maintained at a high temperature.

The salt holdup section 12 is provided with three incineration residue feeding pipes 15 which pass through the furnace lid of the salt holdup section 12 and are immersed into the molten salt layer 51 such that these lower ends are located below the upper surface of the molten salt layer 51. Therefore, the incineration residue is fed into the molten salt layer 51. The shape of the incineration residue feeding pipe 15 is not limited to be cylindrical, and may be prismatic or some other shape as long as the incineration residue is fed into the molten salt layer 51.

The salt holdup section 12 is provided with a cooling unit 16 on its periphery. The cooling unit 16 forcedly cools the molten salt layer 51 and has a structure in which a water-cooling pipe is embedded in a refractory. The water-cooling pipe is provided over a region from near the interface between the molten salt layer 51 and the molten slag layer 52 to near the surface of the molten salt layer 51. Since the surface of the molten salt layer 51 is easily cooled, the molten salt may not be readily discharged due to decreased flowability as a result of excessively decreased temperature. Therefore, it is preferable that a heating unit such as an induction-heating coil be provided on the periphery of the salt discharge port 17 to heat the surface area according to demand.

The operation of the melting furnace for melting the incineration residue containing salt is as follows:

A weighed incineration residue is fed into the incineration residue feeding pipes 15, which are immersed into the molten salt layer 51, and packed in the lower section of the feeding pipes. The incineration residue gradually sinks by its own weight in the incineration residue feeding pipes 15 while being preheated and is fed into the molten salt layer 51 formed in the salt holdup section 12. The incineration residue 50 in the molten salt layer 51 is gradually settled and dispersed to form a mixed layer 51a in which the incineration residue is suspended. As described above, the mixed layer 51a inhibits heat transfer from the molten slag layer 52 to the molten salt layer 51 and suppresses an excessive temperature rise of the molten salt layer 51.

A part of the incineration residue 50 fed into the molten salt layer 51 melts in the molten salt layer 51, and the rest of it sinks to the interface with the molten slag layer 51 maintained at a high temperature and melts there. The melt of the incineration residue is separated into three layers, i.e., the molten salt layer 51, the molten slag layer 52 and the molten metal layer 53, because of specific gravity difference.

The molten slag layer 52 is heated in the slag holdup section 11 by means of electric resistance heat of the molten slag itself formed by energizing between electrodes 13. The temperature of the molten slag layer 52 is controlled to a range of 1,400° C. to 1,600° C. by adjusting the input power.

On the other hand, the temperature of the molten salt layer 51 formed in the salt holdup section 12 is controlled within an adequate range with the cooling unit 16 based on the observed temperature with a thermometer 22 provided in the central section of the molten salt layer 51. The flow rate of the cooling water in the cooling unit 16 is adjusted so that the temperature of the central section of the molten salt layer 51 by the thermometer 22 is in a range of 700° C. to 1,000° C. in order to prevent volatilization of the low-boiling-point materials.

These melts are separately discharged from the furnace. The molten salt is discharged through the salt discharge port 17 provided on the upper side wall of the salt holdup section 12 (above the bottom end of the incineration residue feeding pipes 15). The molten salt does not substantially contain the solid component such as the unmelted incineration residue and exhibits high flowability. Therefore, the molten salt can be discharged at a low flow rate from the salt discharge port 17, and an overflow system can be applied to the discharge.

The reason that the molten salt is discharged in a desirable state is as follows. Mixing of the unmelted incineration residue into the molten salt which is discharged from the salt discharge port 17 does not occur because the incineration residue feeding pipes 15 are immersed into the molten salt layer 51, and the salt discharge port 17 is placed below the bottom end of the incineration residue feeding pipes 15 and above the mixed layer 51a containing the suspended incineration residue.

If the incineration residue feeding pipes 15 are not immersed into the molten salt layer 51 and the incineration residue is fed above the molten salt layer 51, the incineration residue is suspended in the entire molten salt layer and the molten salt containing the incineration residue is discharged. Thus, the molten salt has-significantly high viscosity and thus low flowability, resulting in difficulty in discharge of the molten metal itself.

The molten slag is continuously or intermittently discharged through a slag discharge port 18 provided on the upper side wall of the slag holdup section 11. Since the furnace main body 10 is divided into the slag holdup section 11 and the salt holdup section 12, the level of the interface between the molten salt layer 51 and the slag layer 52 must be located below the salt holdup section 12, i.e., near the bottom of the cooling unit 16, and must be maintained constant in order to achieve successful discharge.

Therefore, the molten slag must be discharged while monitoring the level of the interface between the molten salt layer 51 and the molten slag layer 52. Since the temperature along the vertical direction of the molten salt layer 51 increases toward the interface with the molten slag layer 52, the level of the interface can be monitored by continuously observing the temperature near the interface. The discharge volume of the molten slag is controlled so that the temperature observed with the thermometer 23 provided at the lower portion of the molten salt layer 51 is maintained at a given value. The interface between the molten salt layer 51 and the molten slag layer 52 can, therefore, be maintained to a given level.

The molten metal is intermittently discharged through a metal discharge port 19 provided on the lower side wall of the slag holdup section 11. Gas formed during melting is discharged through an exhaust gas discharge port 20 and disposed.

Figure 3:
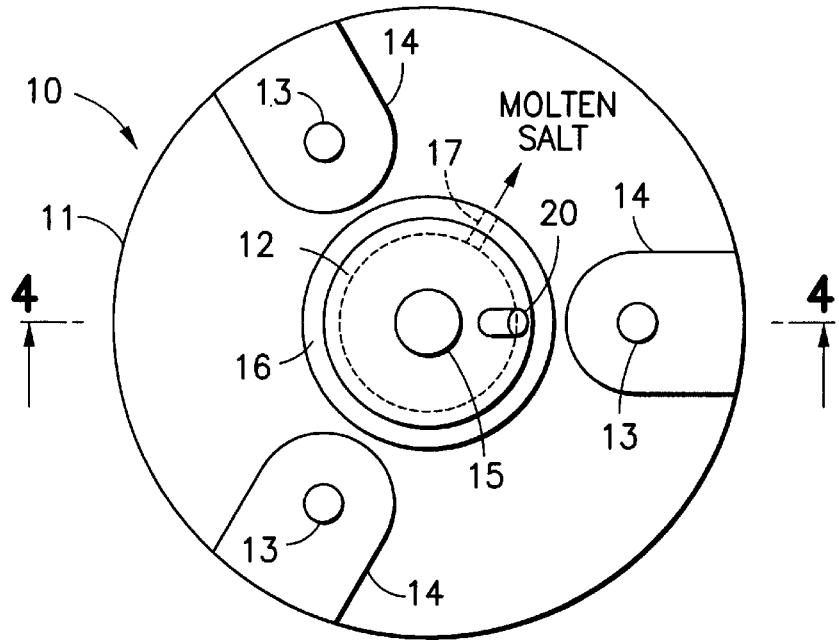
FIG. 3 is a plan view illustrating another embodiment in accordance with the apparatus of the present invention.
Figure 4:
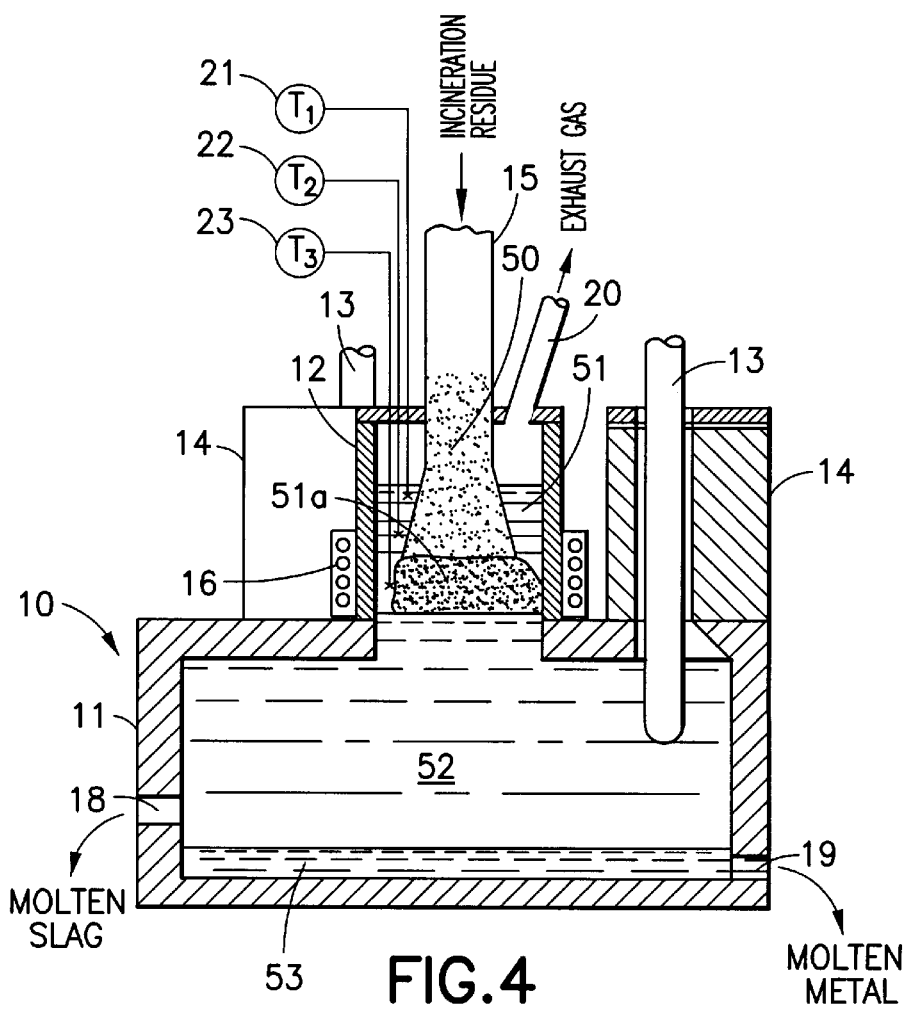
FIG. 4 is a cross-sectional view taken from the line 4—4 in FIG. 3.

FIG. 3 is a plan view illustrating another embodiment in accordance with a melting furnace of the present invention, and FIG. 4 is a cross-sectional view taken from the line 4—4 in FIG. 3. In FIGS. 3 and 4, parts having the same function as in FIGS. 1 and 2 are referred to with the same identification numbers without further description. In this embodiment, the salt holdup section 12 has a significantly smaller inner diameter (a smaller cross-section area of the furnace) compared to the inner diameter of the slag holdup section 11 and is located on the central portion of the slag holdup section 11. From the side view, the salt holdup section 12 is protrudent relative to the slag holdup section 11. The electrode immersion sections 14 is provided near the salt holdup section. Therefore, the salt holdup section 12 and the electrode immersion sections 14 are protrudent on the slag holdup section 11. The incineration residue feeding pipes 15 are provided in the center of the salt holdup section 12.

During the operation of this melting furnace, the interface between the molten salt layer 51 and the molten slag layer 52 is maintained in the salt holdup section 12 having a decreased inner diameter.

The decreased diameter of the salt holdup section 12 results in further suppression of temperature rise in the molten salt layer due to reduced heat transfer from the molten slag layer 52 to the molten salt layer 51 and increased heat radiation through the furnace wall. Therefore, cooling energy for the molten salt layer and the load of the cooling unit 16 can be significantly decreased. In some small furnaces, no cooling unit 16 is required.

According to the present invention, since the temperature of the molten salt layer is controlled to a given range, the vapor pressure of the low-boiling-point materials can be decreased by lowering the temperature of the molten salt layer, and thus the volatilization of the low-boiling-point materials can be suppressed.

Further, since the incineration residue is fed into the molten salt layer during the melting disposal, a mixed layer composed of the molten salt and the incineration residue is formed in the bottom section of the molten salt layer, and heat transfer from the molten slag layer to the molten salt layer can be prevented. Therefore, temperature rise of the molten salt layer and volatilization of the low-boiling-point materials can be suppressed.

Figure 5:
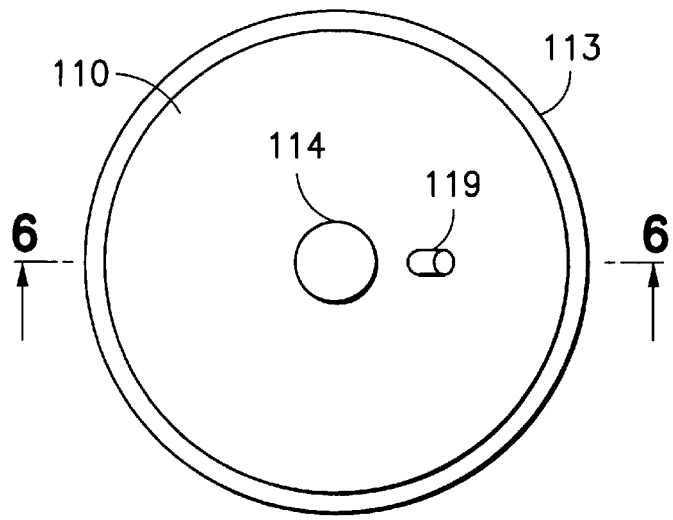
FIG. 5 is a plan view illustrating an embodiment in accordance with the apparatus of the present invention.
Figure 6:
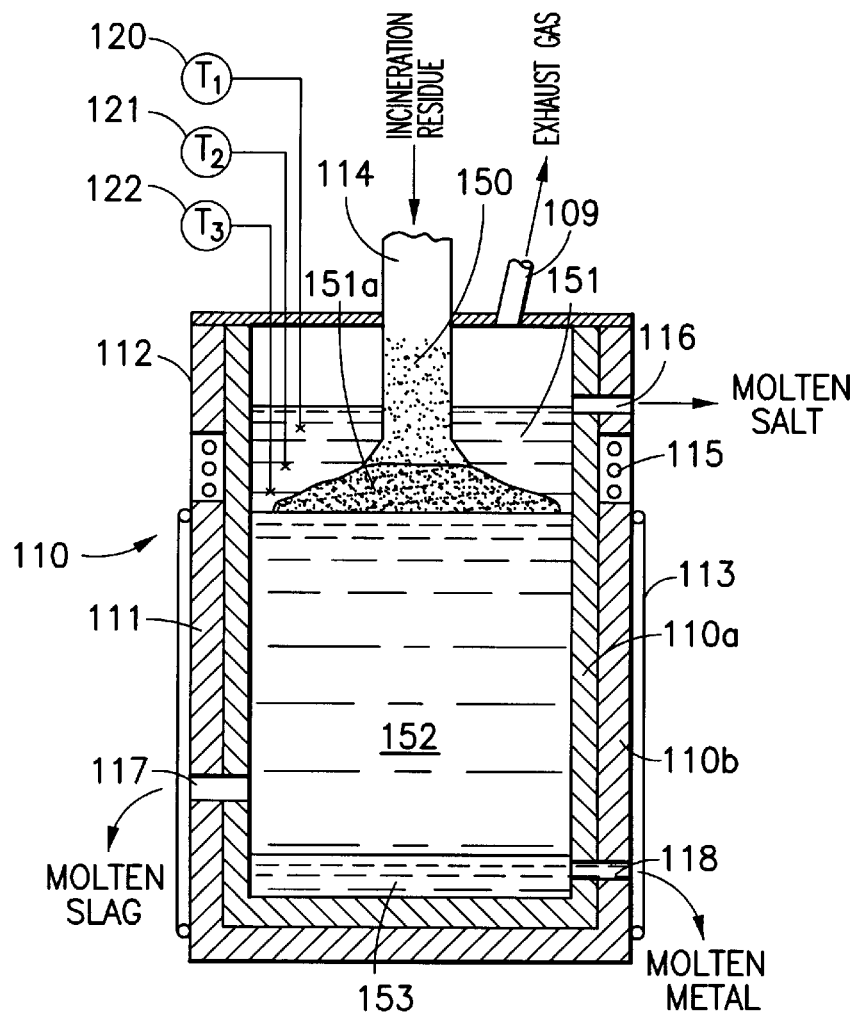
FIG. 6 is a cross-sectional view taken from the line 6—6 in FIG. 5.

FIG. 5 is a plan view illustrating an embodiment in accordance with a melting furnace of the present invention, and FIG. 6 is a cross-sectional view taken from the line 6—6 in FIG. 5. The melting furnace is of an electromagnetic induction heating type and includes a melting furnace main body 110, an induction-heating coil 113, and an incineration residue feeding pipe 114. In the drawings, reference numeral 150 represents an incineration residue containing salts, reference numeral 151 represents a molten salt layer, and reference numeral 152 represents a molten slag layer.

The melting furnace main body 110 has a double layer structure consisting of a graphite container 110a covered with a refractory 110b. Also, the melting furnace main body 110 is divided into a section for holding the molten slag and a section for holding the molten salt, the lower section of the melting furnace main body 110 is a molten slag holdup section 111, and the upper section is a molten salt holdup section 112.

The slag holdup section 111 is provided with an induction-heating coil 113, heats the molten slag by applying a high frequency current flow to the induction-heating coil, and melts the incineration residue fed from the incineration residue feeding pipe 114 by heat of the molten slag layer 152 maintained at a high temperature.

The incineration residue feeding pipe 114 attached to the furnace top main body 110 passes through the furnace wall of the salt holdup section 112 and is immersed into the molten salt layer 151 such that its bottom end is located below the upper surface of the molten salt layer 151. Therefore, the incineration residue is fed into the molten salt layer 151. The shape of the incineration residue feeding pipe 114 is not limited to be cylindrical, and may be prismatic or some other shape as long as the incineration residue is fed into the molten salt layer 151.

The salt holdup section 112 is provided with a cooling unit 115 on its periphery. The cooling unit 115 forcedly cools the molten salt layer 151 and has a structure in which a water-cooling pipe is embedded in a refractory. The water-cooling pipe is provided over a region from near the interface between the molten salt layer 151 and the molten slag layer 152 to near the surface of the molten salt layer 151. Since the surface of the molten salt layer 151 is easily cooled, the molten salt may not be readily discharged due to decreased flowability as a result of excessively decreased temperature. Therefore, it is preferable that a heating unit having an induction-heating coil be provided on the periphery of the salt discharge port 116 to heat the surface area according to demand.

The operation of the melting furnace for melting the incineration residue containing salt is as follows:

A weighed incineration residue is fed into the incineration residue feeding pipe 114, which is inserted into the molten salt layer 151, and packed in the lower section of the feeding pipes. The incineration residue gradually sinks by its own weight in the incineration residue feeding pipe 14 while being preheated and is fed into the molten salt layer 151 formed in the salt holdup section 112. The incineration residue 150 in the molten salt layer 151 is gradually settled and dispersed to form a mixed layer 151a in which the incineration residue is suspended. As described above, the mixed layer 151a inhibits heat transfer from the molten slag layer 152 to the molten salt layer 151 and suppresses an excessive temperature rise of the molten salt layer 151.

A part of the incineration residue 150 fed into the molten salt layer 151 melts in the molten salt layer 151, and the rest of it sinks to the interface with the molten slag layer 151 maintained at a high temperature and melts there. The melt of the incineration residue is separated into three layers, i.e., the molten salt layer 151, the molten slag layer 152 and the molten metal layer 153, because of specific gravity difference.

The slag holdup section 111 is provided with the induction-heating coil 113 and the molten slag is heated by the heat generation of the container 110a under a high frequency current flow applied to the induction-heating coil 113. The temperature of the molten slag layer 152 is controlled to a range of 1,400° C. to 1,600° C. by adjusting the input power.

On the other hand, the temperature of the molten salt layer 151 formed in the salt holdup section 112 is controlled within an adequate range with the cooling unit 115 based on the observed temperature with a thermometer 121 provided in the central section of the molten salt layer 151. The flow rate of the cooling water in the cooling unit 115 is adjusted so that the temperature of the central section of the molten salt layer 151 by the thermometer 121 is in a range of 700° C. to 1,000° C. in order to prevent volatilization of the low-boiling-point materials.

These melts are separately discharged from the furnace. The molten salt is discharged through the salt discharge port 116 provided on the upper side wall of the salt holdup section 112 (above the bottom end of the incineration residue feeding pipe 114). The molten salt does not substantially contain the solid component such as the unmelted incineration residue and exhibits high flowability. Therefore, the molten salt can be discharged at a low flow rate from the salt discharge port 116, and an overflow system can be applied to the discharge.

The reason that the molten salt is discharged in a desirable state is as follows. Mixing of the unmelted incineration residue into the molten salt which is discharged from the salt discharge port 116 does not occur because the incineration residue feeding pipe 114 is immersed into the molten salt layer 151, and the salt discharge port 116 is placed below the bottom end of the incineration residue feeding pipe 114 and above the mixed layer 151a containing the suspended incineration residue.

If the incineration residue feeding pipe 114 is not immersed into the molten salt layer 151 and the incineration residue is fed above the molten salt layer 151, the incineration residue is suspended in the entire molten salt layer and the molten salt containing the incineration residue is discharged. Thus, the molten salt has significantly high viscosity and thus low flowability, resulting in difficulty in discharge of the molten metal.

The molten slag is continuously or intermittently discharged through a slag discharge port 117 provided on the upper side wall of the slag holdup section 111. Since the furnace main body 110 is divided into the slag holdup section 111 and the salt holdup section 112, the level of the interface between the molten salt layer 151 and the slag layer 152 must be located below the salt holdup section 12, and must be maintained constant in order to achieve successful discharge.

Therefore, the molten slag must be discharged while monitoring the level of the interface between the molten salt layer 151 and the molten slag layer 152. Since the temperature along the vertical direction of the molten salt layer 151 increases toward the interface with the molten slag layer 152, the level of the interface can be monitored by continuously observing the temperature near the interface. The discharge volume of the molten slag is controlled so that the temperature observed with the thermometer 122 provided at the lower portion of the molten salt layer 151 is maintained at a given value. The interface between the molten salt layer 151 and the molten slag layer 152 can, therefore, be maintained to a given level.

The molten metal is intermittently discharged through a metal discharge port 118 provided on the lower side wall of the slag holdup section 111. Gas formed during melting is discharged through an exhaust gas discharge port 119 and disposed.

Figure 7:
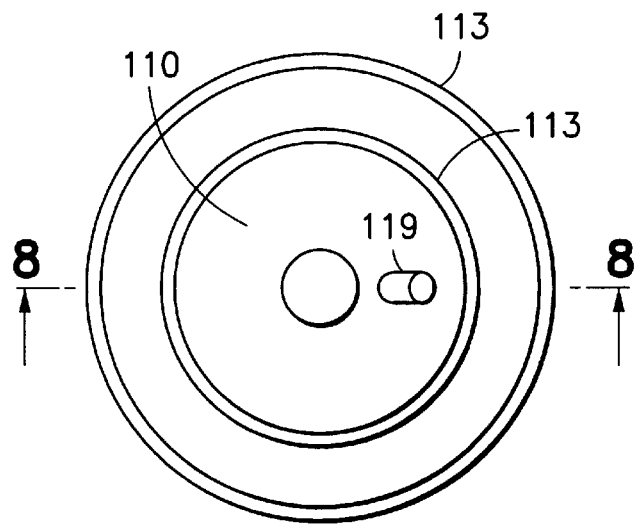
FIG. 7 is a plan view illustrating another embodiment in accordance with the apparatus of the present invention.
Figure 8:
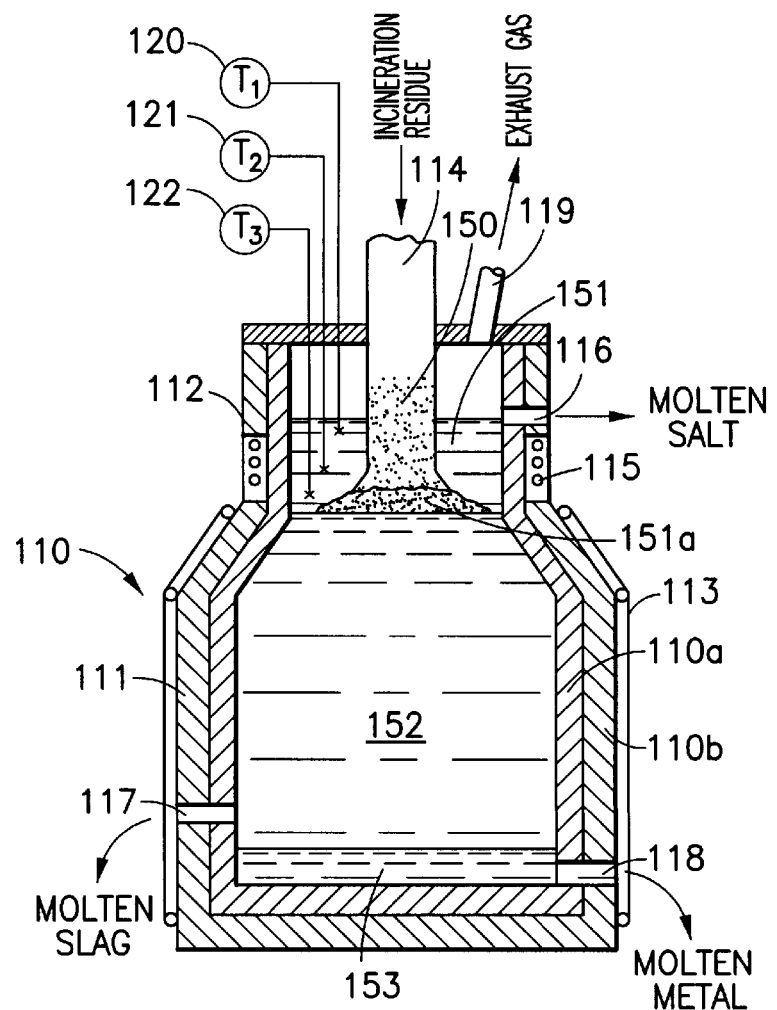
FIG. 8 is a cross-sectional view taken from the line 8—8 in FIG. 7.

FIG. 7 is a plan view illustrating another embodiment in accordance with a melting furnace of the present invention, and FIG. 8 is a cross-sectional view taken from the line 8—8 in FIG. 7. In FIG. 7 and FIG. 8, parts having the same function as in FIG. 5 and FIG. 6 are referred to with the same identification numbers without further description. In this embodiment, the salt holdup section 112 has a significantly smaller inner diameter (a smaller cross-section area of the furnace) compared to the inner diameter of the slag holdup section 111 and is located on the central portion of the slag holdup section 111. From the side view, the salt holdup section 112 is protrudent relative to the slag holdup section 111. The salt holdup section 112 is provided with an incineration residue feeding pipe 114 which is immersed into the molten salt layer 151 so that the bottom end of the incineration residue feeding pipe 114 is located under the surface level of the molten salt layer 151.

During the operation of this melting furnace, the interface between the molten salt layer 151 and the molten slag layer 152 is adjustable to various levels having different effects.

When the interface between the molten salt layer 151 and the molten slag layer 152 is formed in the narrowed portion having a small inner diameter in the furnace as shown in FIG. 8, heat transfer from the molten slag layer 152 to the molten salt layer 151 is reduced due to the reduction in the interface area and heat dissipation from the furnace wall is also reduced. Therefore, the temperature rise of the molten salt layer can be more effectively suppressed. Accordingly, this operation mode can achieve noticeable energy reduction in cooling the molten salt layer and decrease the load of the cooling unit 115. In the case of a small size of melting furnace, the cooling unit 115 may be not necessary.

Figure 9:
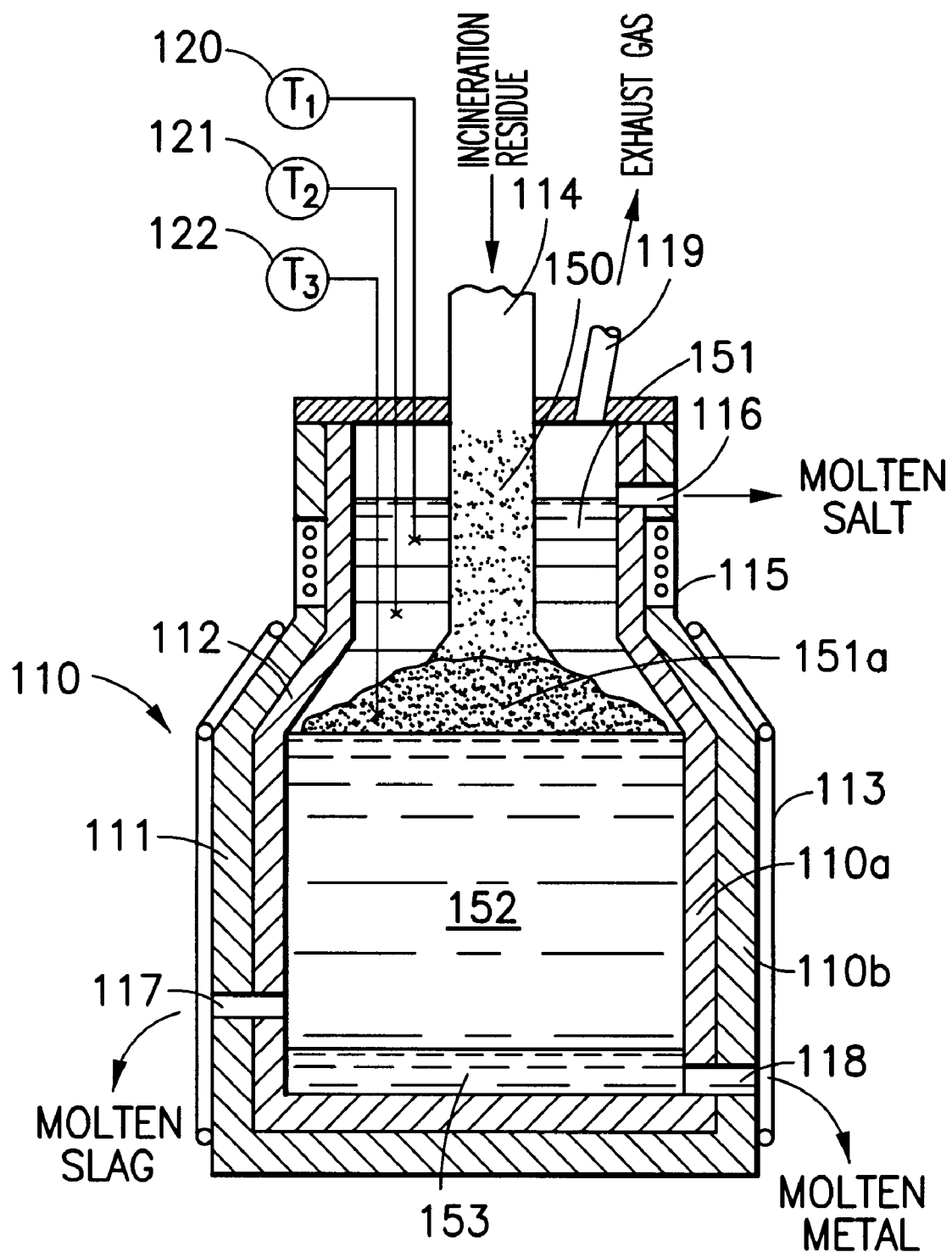
FIG. 9 is a cross-sectional view illustrating a different interface level between a molten salt layer and a molten slag layer.

When the interface between the molten salt layer 151 and the molten slag layer 152 is formed in the thickening and thickened portions having larger inner diameters compared to the narrowed portion, the interface area increases compared to that shown in FIG. 8, heat transfer from the molten slag layer 152 to the molten salt layer 151 is prompted and the cooling unit 115 is forced to be operated under a high load. This mode, however, causes an increase in disposal capacity of the incineration residue because the incineration residue is mainly melted near the interface. In such an operation mode, a melting furnace as shown in FIG. 9 is used, wherein no induction-heating coil 13 is provided above the level of the interface.

In the present invention, since the furnace main body is divided into a slag holdup section for holding and heating the molten slag and a molten salt holdup section provided thereon for holding the molten salt, and a temperature-controlling means for the molten salt layer is provided on the periphery of the salt holdup section, the temperature of the molten salt layer can be decreased, the vapor pressure of the low-boiling-point materials can be decreased by lowering the temperature of the molten salt layer, and thus the volatilization of the low-boiling-point materials can be suppressed.

When the salt holdup section has a smaller cross-section area than that of the slag holdup section, the interface area between the molten salt layer and the molten slag layer can be decreased. Therefore, heat transfer from the molten slag layer to the molten salt layer decreases and heat dissipation from the furnace wall increases at the same time. As a result, the temperature rise of the molten salt layer and volatilization of the low-boiling-point materials can be more effectively suppressed.

When the bottom end of the incineration residue feeding pipe, which is provided in the salt holdup section, is inserted into a position below the upper surface level of the molten salt layer, the incineration residue is fed into the molten salt layer, and a mixed layer composed of the molten salt and the incineration residue is formed in the bottom section of the molten salt layer. Therefore, heat transfer from the molten slag layer to the molten salt layer can be prevented. As a result, temperature rise of the molten salt layer and volatilization of the low-boiling-point materials can be suppressed.

Figure 10:
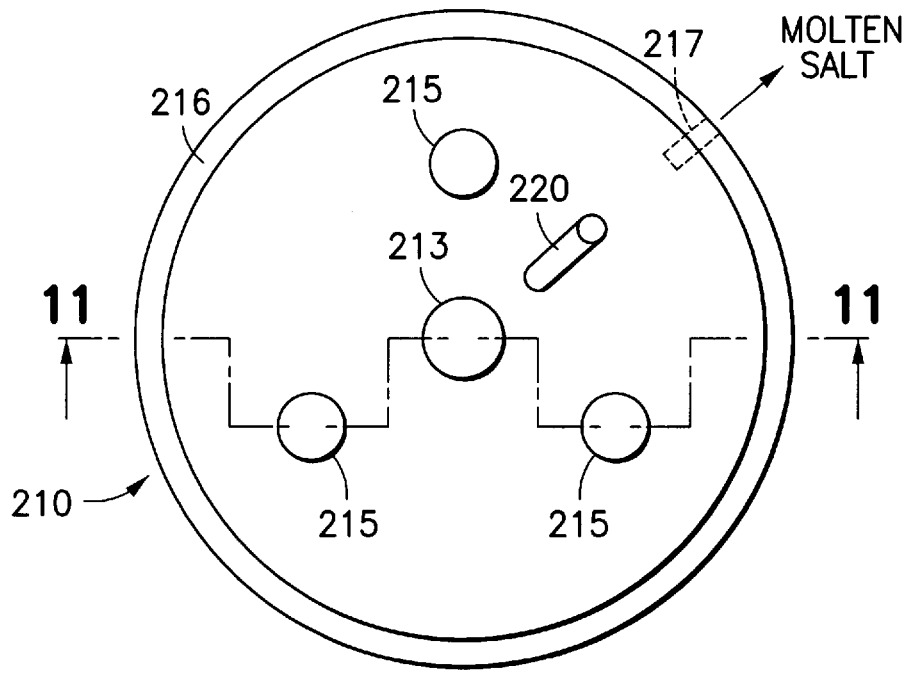
FIG. 10 is a plan view illustrating an embodiment in accordance with the apparatus of the present invention.
Figure 11:
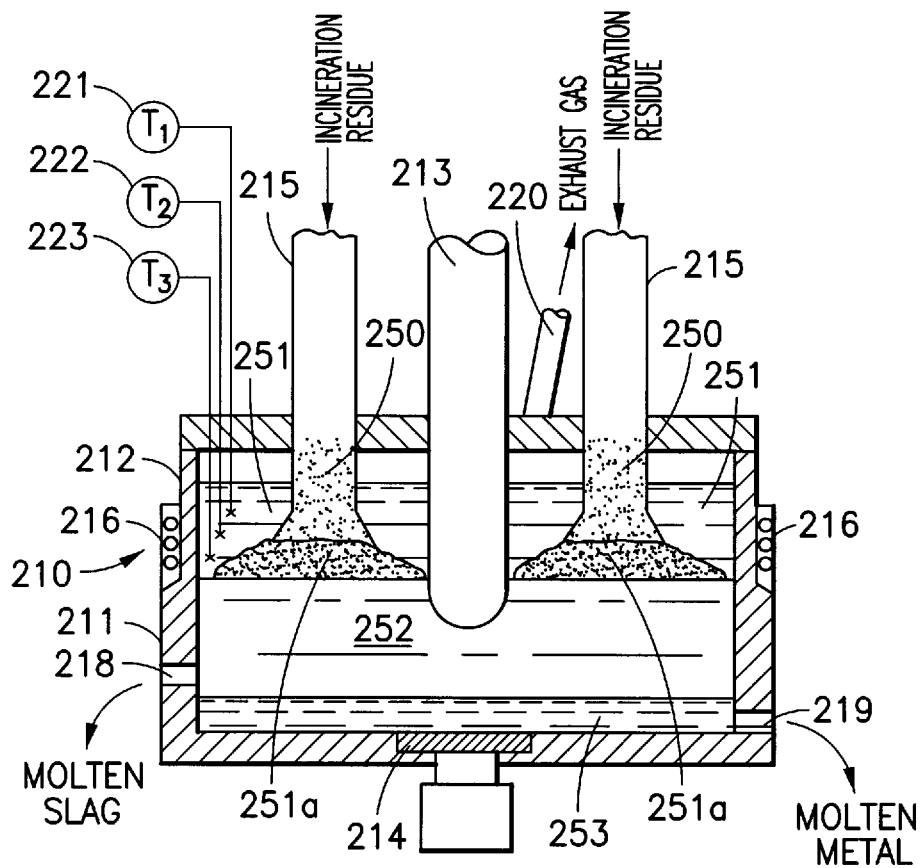
FIG. 11 is a cross-sectional view taken from the line 11—11 in FIG. 10.

FIG. 10 is a plan view illustrating an embodiment in accordance with a melting furnace of the present invention, and FIG. 11 is a cross-sectional view taken from the line 11—11 in FIG. 10. The melting furnace is of a direct current electrical resistance heating type and includes a melting furnace main body 210, a movable electrode 213, a furnace bottom electrode 214, and a plurality of incineration residue feeding pipes 215. In the drawings, reference numeral 250 represents an incineration residue containing salts, reference numeral 251 represents a molten salt layer, and reference numeral 252 represents a molten slag layer.

The melting furnace main body 210 is divided into a section for holding the molten slag and a section for holding the molten salt, the lower section of the melting furnace-main body 210 is a molten slag holdup section 211, and the upper section is a molten salt holdup section 212.

The slag holdup section 211 holds the molten slag, heats the molten slag layer 252 by the introduction of electric current between the movable electrode 213 and the furnace bottom electrode 214, and melts the incineration residue fed from the incineration residue feeding pipes 215 by heat of the molten slag layer 252 maintained at a high temperature.

The salt holdup section 212 is provided with three incineration residue feeding pipes 215 which pass through the furnace cover of the salt holdup section 212 and are immersed into the molten salt layer 251 such that these lower ends are located below the upper surface of the molten salt layer 251. Therefore, the incineration residue is fed into the molten salt layer 251. The shape of the incineration residue feeding pipe 214 is not limited to be cylindrical, and may be prismatic or some other shape as long as the incineration residue is fed into the molten salt layer 251.

The salt holdup section 212 is provided with a cooling unit 216 on its periphery. The cooling unit 216 forcedly cools the molten salt layer 251 and has a structure in which a water-cooling pipe is embedded in a refractory. The water-cooling pipe is provided over a region from near the interface between the molten salt layer 251 and the molten slag layer 252 to near the surface of the molten salt layer 251. Since the surface of the molten salt layer 251 is easily cooled, the molten salt may not be readily discharged due to decreased flowability as a result of excessively decreased temperature. Therefore, it is preferable that a heating unit having an induction-heating coil be provided on the periphery of the salt discharge port 217 to heat the surface area according to demand.

The operation of the melting furnace for melting the incineration residue containing salt is as follows:

A weighed incineration residue is fed into the incineration residue feeding pipes 215, which is inserted into the molten salt layer 251, and packed in the lower section of the feeding pipes. The incineration residue gradually sinks by its own weight in the incineration residue feeding pipes 215 while being preheated and is fed into the molten salt layer 251 formed in the salt holdup section 212. The incineration residue 250 in the molten salt layer 251 is gradually settled and dispersed to form a mixed layer 251a in which the incineration residue is suspended. As described above, the mixed layer 251a inhibits heat transfer from the molten slag layer 252 to the molten salt layer 251 and suppresses an excessive temperature rise of the molten salt layer 251.

A part of the incineration residue 250 fed into the molten salt layer 251 melts in the molten salt layer 251, and the rest of it sinks to the interface with the molten slag layer 251 maintained at a high temperature and melts there. The melt of the incineration residue is separated into three layers, i.e., the molten salt layer 251, the molten slag layer 252 and the molten metal layer 253, because of specific gravity difference.

The molten slag layer 252 in the slag holdup section 211 is heated by the electrical resistance heat formed in the molten metal slag layer 252 itself due to a current flow between the electrodes. The temperature of the molten slag layer 252 is controlled to a range of 1,400° C. to 1,600° C. by adjusting the input power.

On the other hand, the temperature of the molten salt layer 251 formed in the salt holdup section 212 is controlled within an adequate range with the cooling unit 216 based on the observed temperature with a thermometer 222 provided in the central section of the molten salt layer 251. The flow rate of the cooling water in the cooling unit 216 is adjusted so that the temperature of the central section of the molten salt layer 251 by the thermometer 222 is in a range of 700° C. to 1,000° C. in order to prevent volatilization of the low-boiling-point materials.

These melts are separately discharged from the furnace. The molten salt is discharged through the salt discharge port 217 provided on the upper side wall of the salt holdup section 212 (above the bottom end of the incineration residue feeding pipe 215). The molten salt does not substantially contain the solid component such as the unmelted incineration residue and exhibits high flowability. Therefore, the molten salt can be discharged at a low flow rate from the salt discharge port 217, and an overflow system can be applied to the discharge.

The reason for that the molten salt is discharged in a desirable state is as follows. Mixing of the unmelted incineration residue into the molten salt which is discharged from the salt discharge port 217 does not occur because the incineration residue feeding pipe 215 is immersed into the molten salt layer 251, and the salt discharge port 217 is placed below the bottom end of the incineration residue feeding pipe 215 and above the mixed layer 251a containing the suspended incineration residue.

If the incineration residue feeding pipe 215 is not immersed into the molten salt layer 251 and the incineration residue is fed above the molten salt layer 251, the incineration residue is suspended in the entire molten salt layer and the molten salt containing the incineration residue is discharged. Thus, the molten salt has significantly high viscosity and thus low flowability, resulting in difficulty in discharge of the molten metal.

The molten slag is continuously or intermittently discharged through a slag discharge port 218 provided on the upper side wall of the slag holdup section 211. Since the furnace main body 210 is divided into the slag holdup section 211 and the salt holdup section 212, the level of the interface between the molten salt layer 251 and the slag layer 252 must be located below the salt holdup section 212, and must be maintained constant in order to achieve successful discharge.

Therefore, the molten slag must be discharged while monitoring the level of the interface between the molten salt layer 251 and the molten slag layer 252. Since the temperature along the vertical direction of the molten salt layer 251 increases toward the interface with the molten slag layer 252, the level of the interface can be monitored by continuously observing the temperature near the interface. The discharge volume of the molten slag is controlled so that the temperature observed with the thermometer 223 provided at the lower portion of the molten salt layer 251 is maintained at a given value. The interface between the molten salt layer 251 and the molten slag layer 252 can, therefore, be maintained to a given level.

The molten metal is intermittently discharged through a metal discharge port 219 provided on the lower side wall of the slag holdup section 211. Gas formed during melting is discharged through an exhaust gas discharge port 220 and disposed.

Figure 12:
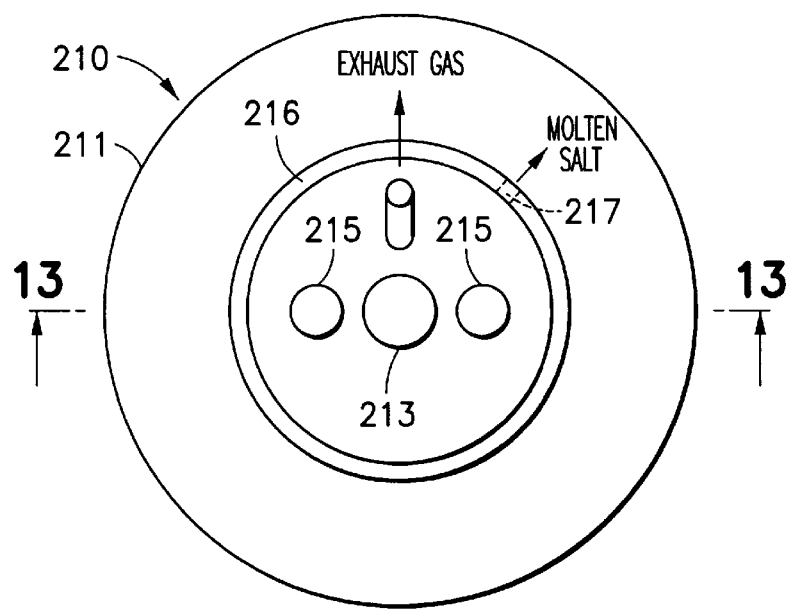
FIG. 12 is a plan view illustrating another embodiment in accordance with the apparatus of the present invention.
Figure 13:
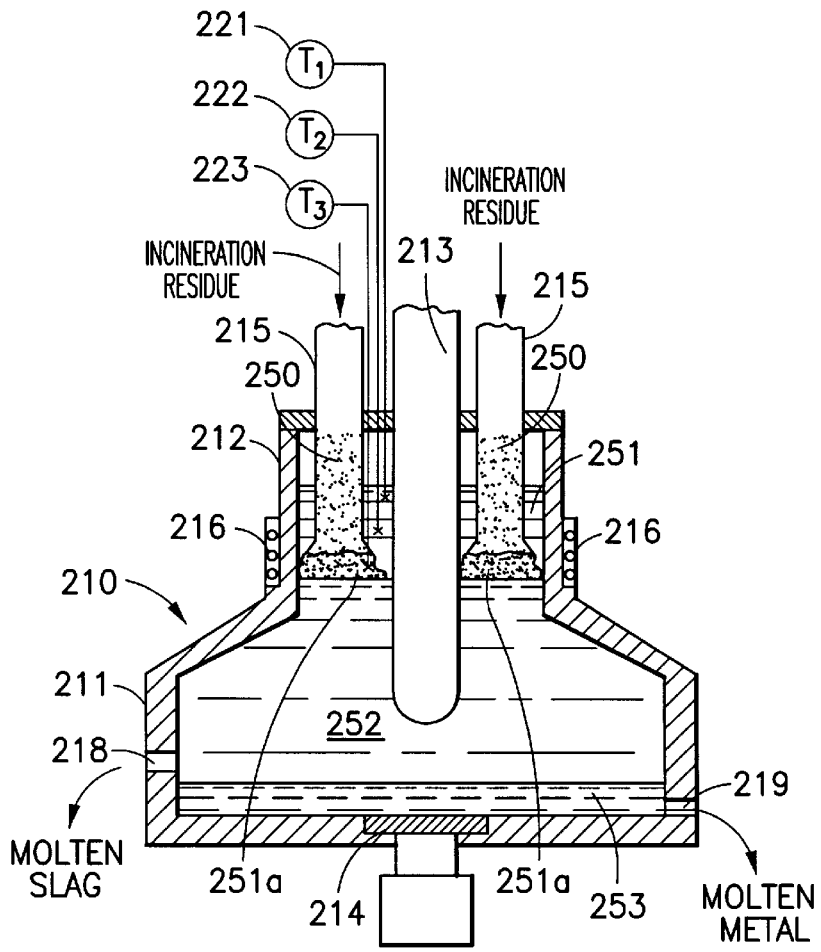
FIG. 13 is a cross-sectional view taken from the line 13—13 in FIG. 12.

FIG. 12 is a plan view illustrating another embodiment in accordance with a melting furnace of the present invention, and FIG. 13 is a cross-sectional view taken from the line 13—13 in FIG. 12. In FIG. 12 and FIG. 13, parts having the same function as in FIG. 10 and FIG. 11 are referred to with the same identification numbers without further description. In this embodiment, the salt holdup section 212 has a significantly smaller inner diameter (a smaller cross-section area of the furnace) compared to the inner diameter of the slag holdup section 11 and is located on the central portion of the slag holdup section 211. From the side view, the salt holdup section 212 is protrudent relative to the slag holdup section 211. The salt holdup section 212 is provided with incineration residue feeding pipes 215 which are immersed into the molten salt layer 251 so that the bottom end of each incineration residue feeding pipe 215 is located under the surface level of the molten salt layer 251.

During the operation of this melting furnace, the interface between the molten salt layer 251 and the molten slag layer 252 is adjustable to various levels having different effects.

When the interface between the molten salt layer 251 and the molten slag layer 252 is formed in the narrowed portion having a small inner diameter in the furnace as shown in FIG. 13, heat transfer from the molten slag layer 252 to the molten salt layer 251 is reduced due to the reduction in the interface area and heat dissipation from the furnace wall is also reduced. Therefore, the temperature rise of the molten salt layer can be more effectively suppressed. Accordingly, this operation mode can achieve noticeable energy reduction in cooling the molten salt layer and decrease the load of the cooling unit 216. In the case of a small size of melting furnace, the cooling unit 216 may be not necessary.

Figure 14:
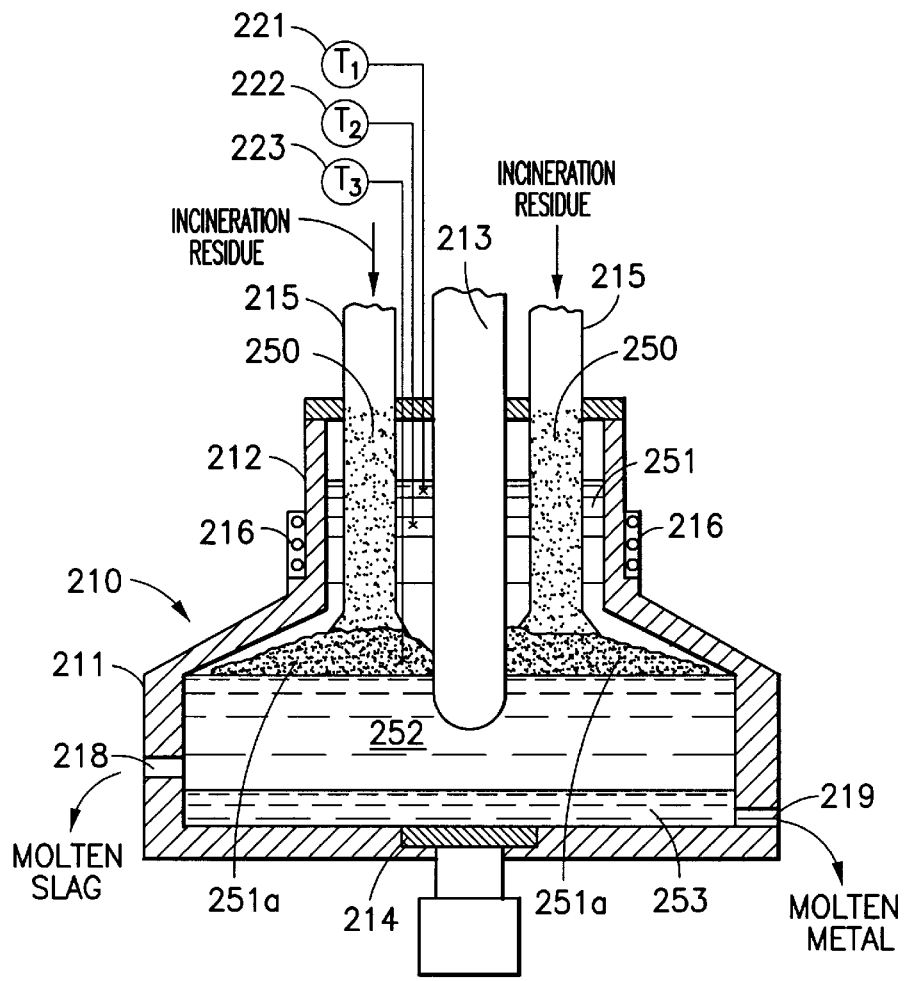
FIG. 14 is a cross-sectional view illustrating a different interface level between a molten salt layer and a molten slag layer.
Figure 15:
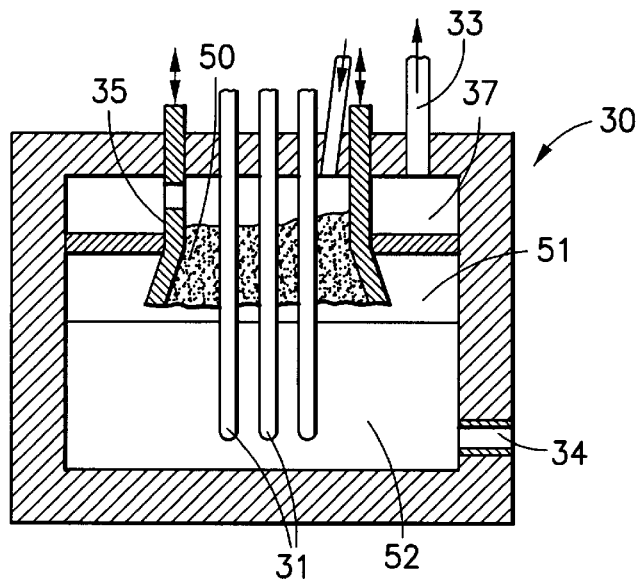
FIG. 15 is an outlined longitudinal cross-sectional view of a conventional electric-resistance-heating-type melting furnace.

When the interface between the molten salt layer 251 and the molten slag layer 252 is formed in the thickening and thickened portions having larger inner diameters compared to the narrowed portion as shown in FIG. 14, the interface area increases compared to that shown in FIG. 13, heat transfer from the molten slag layer 252 to the molten salt layer 251 is prompted and the cooling unit 216 is forced to be operated under a high load. This mode, however, causes an increase in disposal capacity of the incineration residue because the incineration residue is mainly melted near the interface.

In the present invention, since the furnace main body is divided into a slag holdup section for holding and heating the molten slag and a molten salt holdup section provided thereon for holding the molten salt, and a temperature-controlling means for the molten salt layer is provided on the periphery of the salt holdup section, the temperature of the molten salt layer can be decreased, the vapor pressure of the low-boiling-point materials can be decreased by lowering the temperature of the molten salt layer, and thus the volatilization of the low-boiling-point materials can be suppressed.

When the salt holdup section has a smaller cross-section area than that of the slag holdup section, the interface area between the molten salt layer and the molten slag layer can be decreased. Therefore, heat transfer from the molten slag layer to the molten salt layer decreases and heat dissipation from the furnace wall increases at the same time. As a result, the temperature rise of the molten salt layer and volatilization of the low-boiling-point materials can be more effectively suppressed.

When the bottom end of the incineration residue feeding pipe, which is provided in the salt holdup section, is inserted into a position below the upper surface level of the molten salt layer, the incineration residue is fed into the molten salt layer, and a mixed layer composed of the molten salt and the incineration residue is formed in the bottom section of the molten salt layer. Therefore, heat transfer from the molten slag layer to the molten salt layer can be prevented. As a result, temperature rise of the molten salt layer and volatilization of the low-boiling-point materials can be suppressed.

What is claimed is:

1. A method of melting an incineration residue comprising:
    charging an incineration residue containing salts into a melting furnace;
    heating the charged incineration residue in the melting furnace to produce a melt comprising a molten slag and a molten salt, said molten slag forming a molten slag layer and said molten salt forming a molten salt layer on the molten slag layer;
    controlling a temperature of the molten salt in the molten salt layer;
    discharging the molten slag from a molten slag port of the melting furnace; and
    discharging the molten salt from a molten salt port of the melting furnace.

2. The method of claim 1, wherein the molten slag is heated by applying a voltage between a plurality of electrodes which are immersed in the molten slag so as to generate heat due to an electric resistance of the molten slag.

3. The method of claim 1, wherein the molten slag is heated by applying a high frequency electric current to an induction-heating coil which is arranged on a periphery of the melting furnace.

4. The method of claim 1, wherein the molten slag is heated by applying a voltage between a movable electrode which is submerged in the molten slag and a bottom electrode which is arranged at a bottom Portion of the melting furnace.

5. The method of claim 1, wherein the temperature of the molten salt is controlled to be 700 to 1000° C.

6. The method of claim 1, wherein the temperature of the molten salt is controlled to be lowered.

7. The method of claim 6, wherein the temperature of the molten salt is controlled to be lowered by decreasing a heat transfer from the molten slag to the molten salt.

8. The method of claim 7, wherein the decreasing of the heat transfer comprises charging the incineration residue into the molten salt layer to form a mixed layer of the incineration residue and the molten salt in a bottom section of the molten salt layer.

9. The method of claim 7, wherein the decreasing of the heat transfer comprises reducing a cross-sectional area of a molten salt hold-up section in the melting furnace to be smaller than a cross-sectional area of a molten slag hold-up section in the melting furnace.

10. The method of claim 6, wherein the temperature of the molten salt is controlled to be lowered by increasing heat radiation from the molten salt.

11. The method of claim 6, wherein the temperature of the molten salt is controlled to be lowered by cooling the molten salt.

12. The method of claim 1, wherein the incineration residue is charred into the molten salt layer.

13. The method of claim 1, wherein the temperature of the molten salt is controlled by heating a surface of the molten salt.

14. The method of claim 13, wherein the heating of the surface of the molten salt is carried out by induction heating.

15. The method of claim 1, further comprising controlling a temperature of the molten slag to be within a range of 1400 to 1600° C.

16. An apparatus for melting an incineration residue comprising:
    a melting furnace main body into which an incineration residue containing salts is charged;
    the melting furnace main body comprising a molten slag hold-up section and a molten salt hold-up section on the molten slag hold-up section;
    a charging device for charging the incineration residue in the melting furnace main body;
    a heating device for melting the charged incineration residue to produce a melt comprising a molten slag and a molten salt, said molten slag being in the molten slag hold-up section and said molten salt being in the molten salt hold-up section;
    a control device for controlling a temperature of the molten salt in the molten salt hold-up section;
    a slag discharge port for discharging the molten slag from the molten slag hold-up section; and
    a salt discharge port for discharging the molten salt from the molten salt hold-up section to an exhaustive system for preventing clogging.

17. The apparatus of claim 16, wherein said heating device comprises a plurality electrodes which are immersed in the molten slag and between which a voltage can be applied.

18. The apparatus of claim 16, wherein said heating device comprises an induction-heating coil which is arranged on a periphery of the molten slag hold-up section, the molten slag being heated by applying a high frequency electric current to the induction-heating coil.

19. The apparatus of claim 16, wherein said heating device comprises a movable electrode which is immersed in the molten slag and a bottom electrode which is arranged at a bottom portion of the melting furnace main body, the molten slag being heated by applying a voltage between the movable electrode and the bottom electrode.

20. The apparatus of claim 16, wherein said control device is arranged on a periphery of the molten salt hold-up section.

21. The apparatus of claim 16, wherein said control device lowers the temperature of the molten salt.

22. The apparatus of claim 21, wherein said control device decreases a heat transfer from the molten slag to the molten salt.

23. The apparatus of claim 22, wherein said molten salt hold-up section has a cross-sectional area smaller than a cross-sectional area of the molten slag hold-up section.

24. The apparatus of claim 23, wherein said control device lowers the temperature of the molten salt in the molten salt hold-up section.

25. The apparatus of claim 21, wherein said control device increases heat radiation from the molten salt.

26. The apparatus of claim 21, wherein said control device cools the molten salt and is arranged on a periphery of the molten salt hold-up section.

27. The apparatus of claim 16, wherein said charging device comprises an incineration residue feeding pipe arranged at an upper part of the melting furnace main body, and a lower end of the incineration residue feeding pipe is positioned below a surface of the molten salt.

28. The apparatus of claim 16, wherein said control device heats the molten salt on a surface of the molten salt hold-up section.

* * * * *